United States Patent [19]

Hlinsky et al.

[11] 4,024,820

[45] May 24, 1977

[54] LATERAL AND LONGITUDINAL ADJUSTABLE STOWABLE CHOKING SYSTEM

[75] Inventors: Emil J. Hlinsky, Oak Brook; Allen D. Siblik, Mundelein, both of Ill.

[73] Assignee: MacLean-Fogg Lock Nut Company, Mundelein, Ill.

[22] Filed: June 12, 1975

[21] Appl. No.: 586,518

[52] U.S. Cl. ........................ 105/368 R; 105/463; 248/119 R; 296/1 A

[51] Int. Cl.² ........................ B60P 7/08; B60P 7/14; B61D 45/00; B61D 49/00

[58] Field of Search ... 105/366 D, 368 R, 368 WC, 105/368 B, 368 S, 368 T, 490, 463; 248/119 R, 119; 296/1 A

[56] References Cited

UNITED STATES PATENTS

| | | | |
|---|---|---|---|
| 1,424,957 | 8/1922 | Vantilberg | 248/119 R |
| 1,699,290 | 1/1929 | Goodspeed | 248/119 R X |
| 1,733,269 | 10/1929 | Mauk et al. | 248/119 R X |
| 1,776,935 | 9/1930 | Snyder | 105/368 T |
| 1,816,897 | 8/1931 | Fedderman et al. | 248/119 R X |
| 1,934,841 | 11/1933 | Copony | 105/368 R |
| 2,034,893 | 3/1936 | Butterworth | 105/368 R |
| 2,858,905 | 11/1958 | Fahland | 105/368 T X |
| 3,145,805 | 8/1964 | Kammueller et al. | 105/368 R X |
| 3,224,383 | 12/1965 | Gutridge et al. | 105/366 D |
| 3,752,086 | 8/1973 | Smith | 105/490 |

*Primary Examiner*—Robert J. Spar
*Assistant Examiner*—Howard Beltran
*Attorney, Agent, or Firm*—Mason, Kolehmainen, Rathburn & Wyss

[57] ABSTRACT

Adjustable stowable securement apparatus for use with flatbed carriers for providing both lateral and longitudinal chocking of heavy, oversized tracked or wheeled vehicles, wherein the lateral and longitudinal chocking components are operable to adjust from a stowed, flush-with-carrier-deck position to an adjustably raised position for forcibly abutting the vehicle's tires or tracks to effect positive chocking and securement of the vehicle to the flatbed carrier.

22 Claims, 6 Drawing Figures

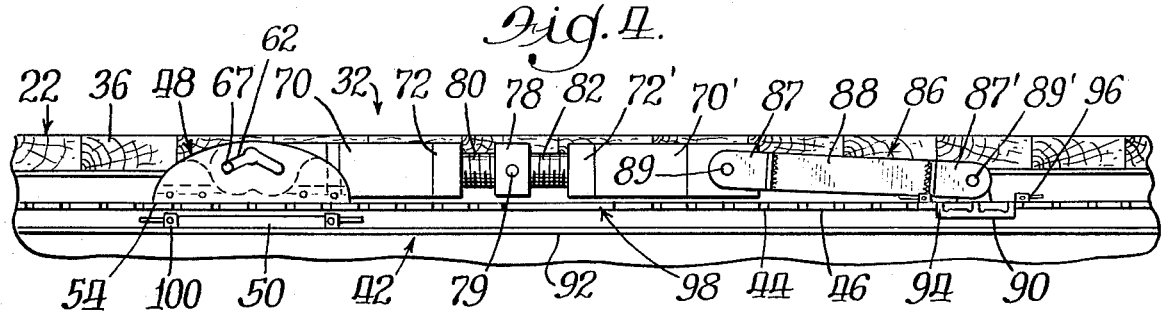
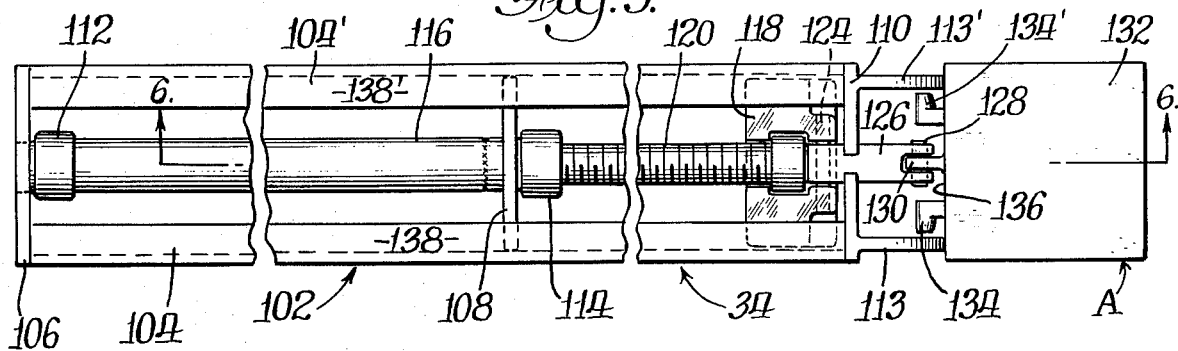
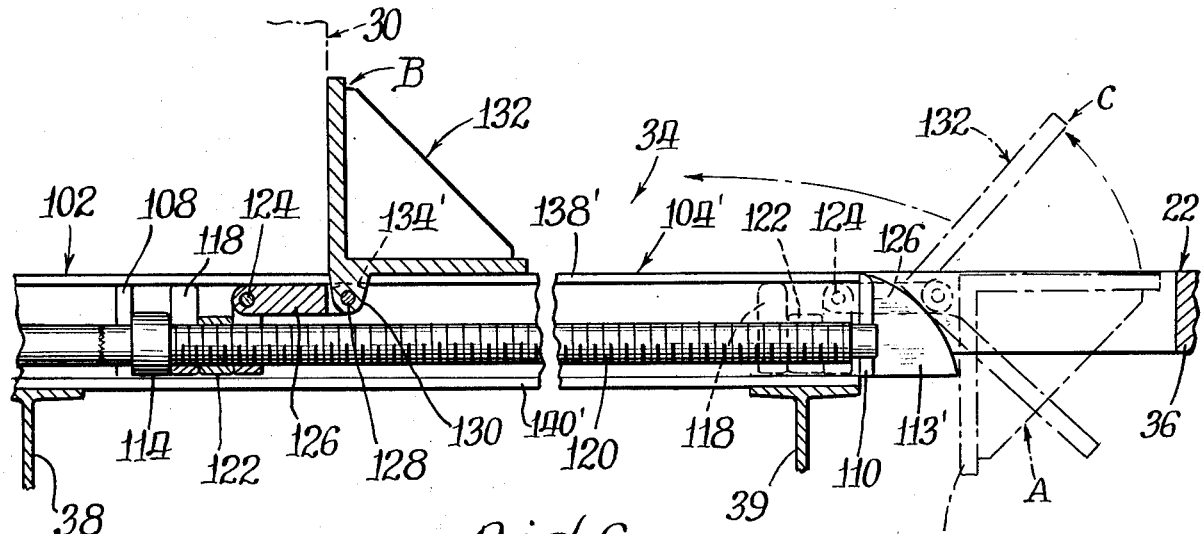

LATERAL AND LONGITUDINAL ADJUSTABLE STOWABLE CHOKING SYSTEM

BACKGROUND OF THE INVENTION

1. Field of the Invention

This invention relates to heavy vehicle chocking systems, and more particularly to stowable adjustable chocking apparatus for use with flatbed carriers for effecting positive longitudinal and lateral chocking of heavy, oversize vehicles.

2. Description of the Prior Art

Many handling and securement problems are encountered when attempting to transport large, heavy wheeled or tracked vehicle equipment such as bulldozers, scrapers, graders, off-highway trucks, and tanks. Typically, these vehicles are transported on railroad flatcars or semi-trailer flatbeds. Because of the tremendous weights of such tracked or wheeled vehicles and the weight-associated problems encountered during their loading, a flatbed securement system preferably should be capable of being stowed at or below the level of the deck or be completely movable to an out-of-way position to protect its components. Alternately, if the securement system is permanently affixed above the carrier's deck, it must have sufficient strength to withstand the tremendous forces of the vehicle's grouser cleats or massive tires as they roll over it. Also, primarily because of ever increasing labor costs to both the shipper and carrier, it is desirable to have a heavy vehicle securement system for flatbed carriers of the type requiring a miminum amount of set-up and removal time.

Several devices are known for effecting either direct tie-down securement or block chocking of large wheeled or tracked vehicles. For purposes of the description herein, the term longitudinal shall mean aligned with the length of a flatbed carrier, and the term lateral shall mean transverse, or across the width, of a carrier. Also, the term track shall mean metallic grousers in an articulated series, while the term tread shall mean the ground-engaging periphery of a rubber tired vehicle. Some prior art chocking devices utilized restraining arms which provided direct longitudinal restraint to the vehicle axle. Anchorage of the deck-engaging ends of these restraining arms was effected in various ways, such as by being individually nailed to the carrier's wooden decking, or by threaded fastener or frictional connection to a longitudinally aligned track formed in the carrier's deck. Other known vehicle securement systems include non-stowable chocks which had a permanent curved configuration conforming to the vehicle's wheels; a common chock was the crudely-shaped wooden chock. Typically, these vehicles were operable to be slid along tracks formed in the deck, and then fastened at the desired position by numerous fastening means. Still other known chocking devices included flat chocking plates capable of being raised from a flush-with-the-deck storage condition to the desired operating position, and then affixed to the flat bed via threaded fasteners. While one type of known vehicle chocking system combined individual movable chocks with chain or cable tie-down devices, still other systems used spring-urged, horizontally-extending arms to forcibly maintain the chock in the desired position. Devices of the prior art typifying the foregoing are illustrated in the following U.S. Letters Patent:

| | |
|---|---|
| 1,699,290 | 1,816,897 |
| 1,733,269 | 2,034,893 |
| 1,776,935 | 3,752,086 |

Because of the tremendous forces developed in heavy vehicles during their shipment, extreme securement forces are necessary to overcome vehicle movements such as swaying, cocking, and bouncing. Thus, any chocking system used must necessarily provide direct positive restraint to the heavy vehicle's tracks or wheels. Furthermore, because of the desirability of utilizing the least amount of labor possible during shipper handling of these vehicles, any adjustable chocking means must be quickly operable so as to allow expeditious loading and unloading. Since many heavy vehicles are oversize in comparison to the width of a normal flatbed carrier, and also of various overall shapes and sizes, it is desirable that any flatbed securement apparatus be adjustably operable to secure any heavy vehicle, regardless of the latter's width, length, tread dimensions, or even its tread type, such as metallic, resilient, etc.

SUMMARY OF THE INVENTION

The present invention is directed to a two direction, adjustable stowable chocking system for securing heavy, oversize treaded or tracked vehicles to flatbed carriers, the chocking system including lateral chocking means capable of being stowed in a condition flush with the carrier deck and raiseable to a vertical operating position wherein it can be adjusted to accommodate the width and type vehicle being secured, and a reversible, adjustable longitudinal chocking means capable of being stored flush with the deck and operably raised to the desired load-engaging height, whereby direct axial loading of the longitudinal chocking means's main restraining arm is assured. During top, side, or end loading of the heavy vehicle onto the flatbed carrier, no chocking components of the present invention rise above the deck to interfere with the loading. Both the longitudinal and lateral chocking means are used in conjunction with one another to effect positive vehicle track or tread engagement, regardless of longitudinal position of the vehicle on the flatbed carrier, and no matter what vehicle width, length, tread size, or track design is involved. The longitudinal chocking means is further provided with the capability of being swingably adjusted so as to chock in either of two directions, viz. towards either end of the flatbed carrier.

No additional tie-down type apparatus, such as flexible chains or cables, is necessary to insure securement of a heavy vehicle to a flatbed carrier, since the vehicle's immense weight is advantageously utilized by the chocking system of this invention to effect adequate vehicle securement. However, it is to be understood that additional tie down means, such as chains clamping a grouser track to a flatbed deck to take up track slack, can be utilized where deemed necessary, such as to prevent substantially all forward momentum tendencies of a chocked vehicle. Longitudinal anchorage tracks for this invention's longitudinal chocking system are carried below the carrier's deck and additionally provide anchorage and storage for any anchor lugs or chains of any auxiliary securement system, such as for the tie-down of unwieldly vehicle attachments, such as bulldozer blades, scarifier teeth, and extendable booms, for example. This auxiliary securement capability is available without any interference to the positioning and fine adjustment of the chocking components of this invention.

Utilization on a flatbed carrier of the present invention obviates several problems associated with the previously described prior art devices. Particularly, the fact that the lateral and longitudinal chocking components of this invention are stowable allows multi-purpose use of the carrier. Interference by the prior art's above deck chocking components during vehicle loading is eliminated. Since the longitudinal restraining means of this invention has selectively adjustable arcuate anchor plates capable of being pre-positioned and locked along the carrier's deck before heavy vehicle loading, there is eliminated any excessive labor such as is needed in several prior art devices like hand nailing of anchor lugs, hand-fitting of wooden chock blocks, or hand feeding of chain about axles or grouser tracks. Utilization of this invention also eliminates the need for any secondary chain tie-down systems (other than for vehicle attachments or to take up grouser track slack where deemed necessary), since this invention provides adequate securement with its two-way (lateral and longitudinal) restraining apparatus.

It is one of the primary objects of this invention to provide an adjustable, stowable chocking sytem for securement of heavy vehicles to flatbed carriers, capable of providing both longitudinal and lateral load engagement.

It is another object of this invention to provide a chocking system for effecting securement of heavy vehicles regardless of whether the vehicle being chocked is of the tracked or treaded variety.

As another object of this invention, there is the provision of a heavy vehicle chocking system adjustably operable for effecting direct load engagement no matter what tread type, track width, vehicle width, or vehicle length is involved.

It is a further object of this invention to provide a vehicle chocking system for a flatbed carrier having chocking components which are completely stowable to facilitate vehicle loading, and further to effect multi-purpose use of the carrier.

A still further object of this invention is the provision of a completely adjustable, longitudinal chocking and restraining system capable of being pre-positioned at the desired load-engaging location and then subsequently fine-positioned to effect positive direct securement, regardless of the vehicle's exact placement on the carrier.

Another object of this invention is the provision of a longitudinal chocking system capable of providing load engagement in either of two directions.

The means by which the foregoing and other objects of the present invention are accomplished and the manner of their accomplishment will be readily understood from the following specification upon reference to the accompanying drawings, in which:

FIG. 4 is a fragmented side view of the longitudinal chocking system of this invention, shown in the stowed position;

FIG. 5 is a plan view of the lateral chocking system of this invention with parts broken away for better viewing; and FIG. 6 is a fragmented side view of the lateral chocking system of this invention shown in solid in the upright load engaging position, and shown in phantom in various operating and stowed positions, the view being taken substantially at the position indicated by line 6—6 of FIG. 5, and in the direction indicated by the accompanying arrows.

DESCRIPTION OF THE PREFERRED EMBODIMENT

Figure 1:
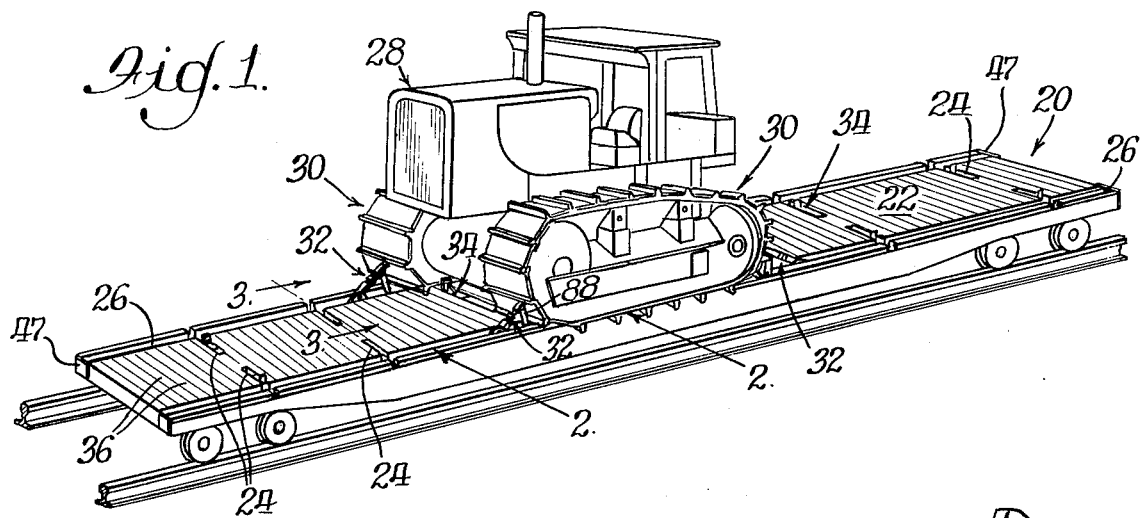
FIG. 1 is a perspective view (from top, side, and end) showing a flatbed carrier utilizing the adjustably stowable chocking system of the present invention for securing a heavy, crawler-type vehicle to the carrier's deck.
Figure 3:
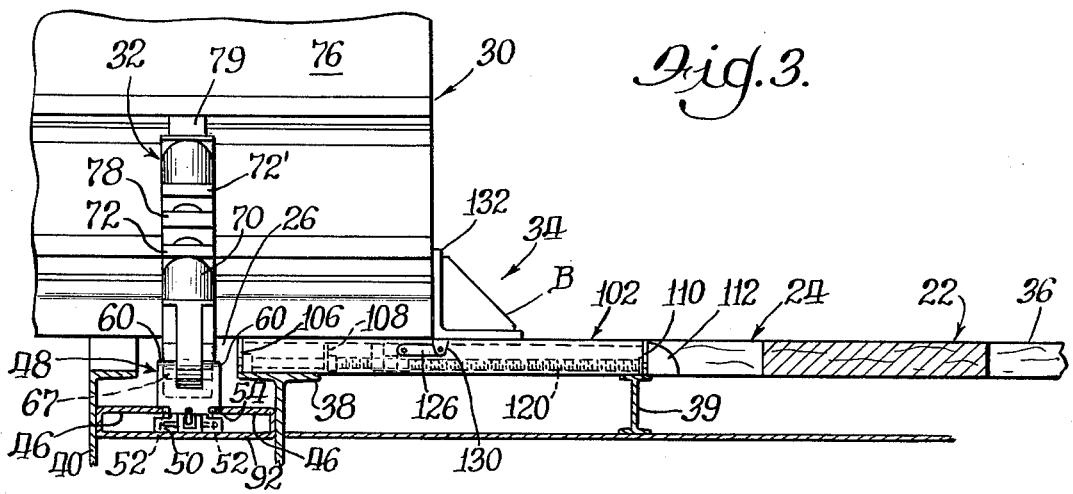
FIG. 3 is a front elevational view (taken substantially along line 3—3 of FIG. 1) of the longitudinal and lateral chocking systems of this invention shown in their upright, load engaging positions.

There is shown in FIG. 1 a typical flatbed carrier, generally denoted by reference numeral 20, here being shown as a railroad flatcar, preferably of the cushioned variety. It is to be understood that the invention disclosed herein could readily be adapted to other flatbed carriers, such as semi-trailer flatbeds, for example. Formed on the carrier's deck 22 are plural laterally-extending openings 24 operable to house the lateral chocking components of this invention. Also formed in deck 22 are longitudinal extending openings 26 for housing this invention's longitudinal chocking components. A typical heavy tracked vehicle, generally denoted by reference numeral 28 in FIG. 1, is shown in a centrally loaded position along the length of carrier 20. (While it is to be understood that treaded or rubber-tired vehicles such as farm implements or off-road earth moving machines, for example, can be chocked utilizing the present invention, the preferred embodiment of this invention will be described as relating to a heavy vehicle having as its ground engaging members, two metallic grouser tracks, the latter being generally denoted by reference numeral 30.) As best seen in FIGS. 1 and 3, oftentimes the heavy vehicles being secured have such large overall widths that the grouser tracks 30, 30 on each side of the vehicle 28 extend unsupported in an outward manner on either side of the carrier's deck 22. Also depicted in FIG. 1 are the apparatus of the longitudinal chocking system of this invention, generally denoted by reference numeral 32, and of the lateral chocking system, generally denoted by reference numeral 34. (It will be understood that a reference numeral bearing a prime mark refers to a separate, but similarly configured, element as identified by the reference numeral standing alone.)

Figure 2:
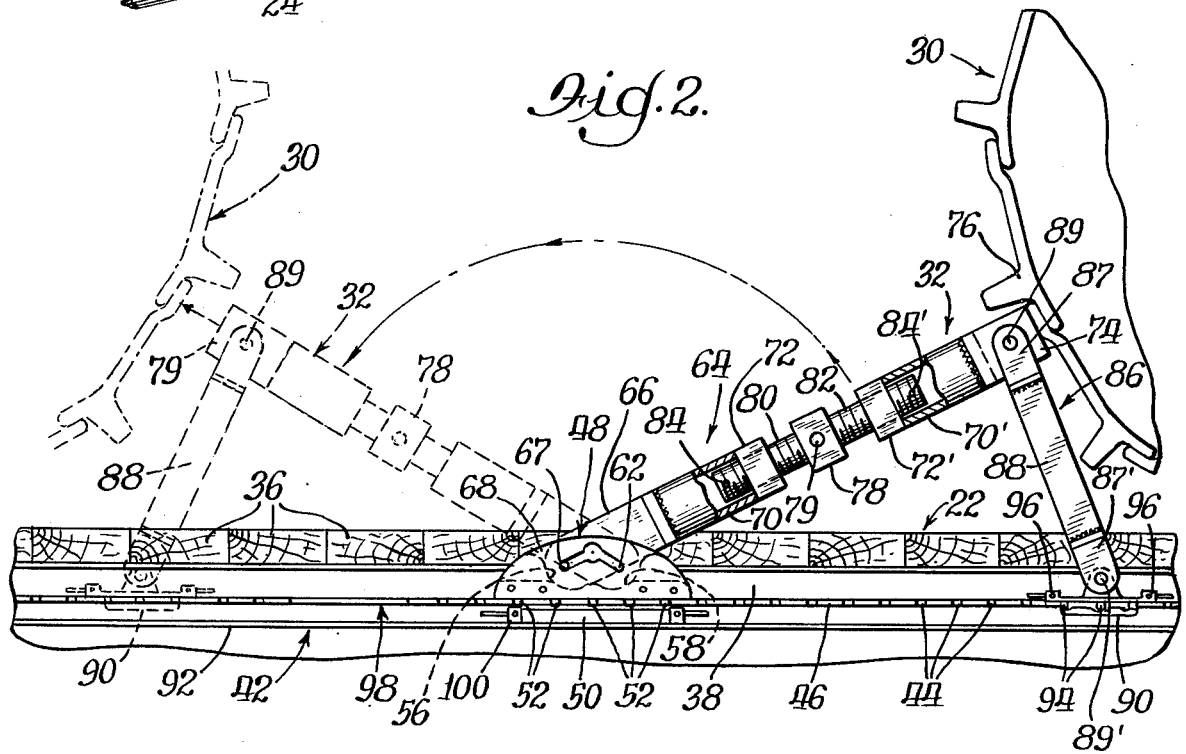
FIG. 2 is a side elevational view (taken substantially along line 2—2 of FIG. 1) of a preferred form of the novel apparatus of the longitudinal chocking system as disclosed herein, with a reversed operational position shown in phantom, and with parts broken away to facilitate viewing.

The top surface of deck 22 is formed of a replaceable material such as transversely aligned wooden planking 36 (FIGS. 2 and 3). It will be noted that vehicle 28 can be drop-loaded from the top via a crane, end-loaded from either an inclined ramp or from an end-loading dock at the level of the carrier's deck 22, or side-loaded from a side loading dock whereupon once the vehicle 28 is laterally loaded, the grouser tracks 30, 30 are slued, i.e., reversely rotated in relation to one another, until the vehicle is longitudinally-aligned with the carrier's deck. It will be understood, then, that the planking 36 will withstand extreme damaging loading forces.

Accordingly, the lateral and longitudinal tracks of this invention's chocking system are advantageously located below the surface of deck 22 so as not to be injured during the loading period.

There are depicted in FIG. 2 the individual components of the longitudinal chocking system 32 of this invention. The wooden planking 36 is undersupported by stringers 38, 39, 40, themselves being undersupported by well-known plural cross sills (not shown). A longitudinal track 42 is formed within each of the longitudinal openings 26. Preferably, each track 42 is built up from structural steel components and rigidly fastened to the stringers 38, 40, such as by welding. Notches 44 are formed, such as by punching, within the upper flanges 46 of longitudinal track 42, and, after final assembly of chocking components, each track 42 is permanently capped with an end plate 47 (FIG. 1).

An arcuate shaped anchor block 48 is operable to be adjustably slid along track 42 into operating position and releasably locked thereto. Anchor block 48 comprises a downwardly extending retention flange assembly 50, the latter being operable to prevent removal of the arcuate anchor block, and thus the longitudinal chocking system 32 from the carrier's deck 22. Block 48 also comprises plural downwardly extending spaced lugs 52, operable to abuttingly engage plural notches 44 in track 42 for providing longitudinal restraint to anchor block 48. A bottom surface 54 of block 48 laterally overlaps the top surfaces of upper flanges 46 of track 42 for undersupporting block 48 at any adjusted position along track 42. The upper central surface formed on block 48 consists of two curved bearing surfaces 56, 58, and the two, similarly-configured side flanges 60, 60 of block 48 have slots 62, 62 formed therein for purposes which will be explained later herein.

In addition to arcuate anchor block 48, the longitudinal chocking system 32 also comprises a main longitudinal restraining arm denoted generally by reference numeral 64. Restraining arm 64 consists of several components including a bearing clevis 66 having a curved bearing end 68, and two laterally-extending pins 67. The latter is operable to bearingly abut against either of the two curved bearing surfaces 56, 58, depending in which direction the longitudinal restraining arm 64 is to provide restraint. Rigidly affixed at one end to bearing clevis 66, such as by welding, is a tubular member 70 having its other end rigidly connected to a first internally threaded end plate 72.

The upper or load engaging end of longitudinal restraining arm 64 comprises a bearing block 74 which is operable to directly abut an individual grouser 76 of grouser track 30. Rigidly attached to bearing block 74 is a second tubular member 70' which terminates in a second internally threaded plate 72'. The upper and lower ends of longitudinal restraining arm 64 are threadedly interconnected via an adjusting nut 78, having left- and right-hand threaded sections 80, 82 respectively rigidly connected thereto. Retaining pins 84, 84' are inserted into holes formed in the outer ends of sections 80, 82 to prevent their removal from end plates 72, 72'. The adjusting nut 78 has a thru hole 79 formed therein to receive an operator's breaker bar, or other similar rod-like device, for turning the nut 78 so as to fine-position, i.e. axially extend or shorten, the longitudinal restraining arm 64 during vehicle loading.

It will be understood that block 74 can be resilient or non-resilient, permanent or detachable, partially tiltable or rigid, or have any other feature, such as additional bearing spacer plates, or other configuration depending on the ground engaging member of the vehicle being chocked. It is preferable if block 74 is captive to the longitudinal system 32 so as not to be separated and inadvertently misplaced. Furthermore, threaded sections 80, 82, and end plates 72, 72', are formed with power transmission threads having a helix angle of sufficient pitch as to effect axial self-locking of longitudinal restraining arm 64 once it has been fine-positioned and threadedly adjusted. Accordingly, there is expected no progressive loosening of arm 64 when operating under restraining loading, or under trainline vibration.

A vertical support arm 86 (formed of upper and lower clevises 87, 87', and support member 88), is pivotally connected to the upper end of longitudinal restraining arm 64 via pins 89 which extend laterally from each side of bearing block 74. The lower clevis 87' is pin connected at pin 89' to a vertical anchor block 90. Anchor block 90 is capable of being dropped from its track engaging position (FIG. 2) and slid along lower flange 92 of longitudinal track 42 to the desired operating position, and then raised into its track engaging, load supporting position whereat upwardly extending lugs 94 engage notches 44 of upper flange 46. Any well-known retaining means, such as barrel bolt means 96, can be utilized to vertically retain the anchor block 90 in the desired operating position, and to prevent block 90 from falling down out of engagement with upper flanges 46 of track 42 once upwardly-directed forces (via arm 86 and pin 89') have been removed, such as when the bearing block 74 is not directly engaging a grouser 76. (A similar barrel bolt retaining means 100 is utilized on arcuate anchor block 48 to prevent it from bouncing out of its desired retaining position during carrier movements.)

It will be understood that, when longitudinal restraining arm 64 has been threadedly adjusted and in the compressively-loaded, chocking operating position, there is no loading placed on pins 67 of clevis 66. This is because slots 62 are so formed in side flanges 60 that once curved bearing end 68 has abutted either bearing surface 56, or 58, on anchor block 48, pins 67 do not bear against the outer ends of slot 62. Moreover, since vertical support arm 86 is designed to be loaded in tension when longitudinal system 32 is in chocking position (except when bearing block 74 does not directly bear against grouser 76), the barrel bolt retaining means 96 sees no load (except when vertically supporting the combined weights of block 90, arm 86, and arm 64) because the chocking forces on 86 and block 90 are upwardly directed.

As seen in FIG. 2, the longitudinal chocking system 32 has been raised from the below deck, stowed position (FIG. 4), to any upright load-engaging position as shown in solid lines in FIG. 2; the height of block 74 above deck 22 is dependent (within limits) on the spacing between blocks 48, 90. Moreover, if desired, the longitudinal chocking system 32 can be completely reversed or flipped over to an oppositely-directed restraining position (as shown in phantom lines in FIG. 2). To effect this reversal, the vertical anchor block 90 is moved to an opening 98 (formed at spaced locations in upper flange 46 of track 42 and of a length shorter than flange plate 50 so as to prevent removal of anchor block 48). Block 90 is then lifted upwardly, along with the attached arms 64, 86 and pivoted and flipped over to the oppositely-directed restraining position. Then arcuate anchor block 48 is moved to a position on the opposite side of opening 98, whereupon vertical anchor block 90 is re-inserted through opening 98, and its lugs 94 are re-engaged with the desired notches 44. Because the pins 67, which are harbored one each within the slots 62, allows the bearing clevis 66 to assume either the dotted position of FIG. 2 (wherein clevis 66 bears against curved bearing surface 58) or the solid line position of FIG. 2 (wherein clevis 66 bears against the bearing surface 56), anchor block 48 allows the longitudinal chocking system to be reversible, as well as stowable and adjustable.

FIG. 4 depicts the longitudinal chocking system 32 in its stored below-deck position. As can be seen, no longitudinal chocking components of this invention, once they have been fully stowed, rise above the deck 22 to interfere with vehicle loading.

Turning now to the lateral chocking system 34, as best seen in FIGS. 3, 5, and 6, a lateral housing 102 is undersupported by stringers 38, 39 and is mounted flush with the deck 22. It will be noted that lateral housing 102 can preferably be mounted below the level of deck 22, as is the longitudinal track 42, so that it will not be damaged during loading of vehicle 28. The housing 102 is preferably formed from two structural steel channel members, 104, 104' rigidly fastened together, such as by welding with a front end plate 106, the center support 108, and a rear end plate 110, the latter having two chock guide plates 113, 113' rigidly fastened, such as by welding, thereto, the purpose of which will become obvious later herein. The front end connector 112, and center connector 114 are rotatably bearingly harbored within openings (not shown) formed respectively in front end plate 106 and surface support 108, and have a drive rod 116 rigidly connected therebetween. It will be understood that front end connector 112 has a square drive opening (not shown) formed therein for receiving a square drive end of a ratched handle (not shown), or of an operator's breaker bar (not shown).

The nut anchor block 118, is harbored between and glides along the upper flanges 138, 138' and lower flanges 140, 140' of channel members 104, 104'. Nut anchor block 118 is operable to be moved from an extreme stowed position (at the extreme right-hand position in FIGS. 5 and 6), to an extreme chocking position whereat it abuts center connector 114 (as seen at the extreme left-hand position in FIG. 6). A threaded shaft 120 is rotatably connected such as by a drive socket, to center connector 114, and also threaded into a retained nut 122, the latter being harbored against rotation by the nut anchor block 118. Pin connected to nut anchor block 118, via pin 124, is a connecting arm 126, the latter being pin connected through a pin 128 and a connector lug 130, to a lateral chock plate 132. The operation of chock plate 132 will be described later herein. Two chocking lugs 134, 134' are an integral part of the bottomside 136 of chock plate 132.

The chocking operation of the lateral system 34 can be done from ground level. It will be understood that when an operator's square drive device, such as the abovementioned square drive ratchet handle, is inserted into the square drive opening (not shown) of connector 112 and rotated, the lateral chock plate 132 can be raised from its stowed below-deck position (shown as position A in FIGS. 5 and 6), to an upright, load-engaging chocking position (shown as position B of FIGS. 3 and 6). An intermediate position during the raising of the plate 132 is shown in position C of FIG. 6. The lateral chocking plate 132 can be so laterally moved, as it is obvious that when drive rod 116 is rotated, which correspondingly rotates threaded shaft 120, the retained nut 122, unable to rotate within the harboring nut anchor block 118, is axially displaced along threaded shaft 120. When nut 122 is axially moved along shaft 120, the nut anchors 118, 118' and the pivotally connected connecting arm 126, are both axially displaced therewith, causing lateral chock plate 132 to rotate about pin 130 against the curved cam surfaces of chock guide plates 113, 113' to move from the below-deck store position (A), through the intermediate position (C), to its upright chocking position (B). This operation allows the lateral system 34 to be self-storing. Because the various connecting members attached to the nut anchor block 118, and the lateral chocking plate 132, viz., pin 124, connecting arm 126, pin 128, and connector lug 130, are capable of articulating when chock plate 132 is moved from position (A) to position (B), the lateral chock plate 132 can be so positioned and forcibly snubbed against grouser track 30 (FIG. 6) that chocking lugs 134, 134' are brought to bear directly against the bottom surface of the upper flanges 138, 138' of channels 104, 104'. Accordingly, once lateral chock plate 132 is drawn up tight against grouser track 30 via the rotatable driving of connector 112 as previously mentioned, and further once the lugs 134, 134' have been brought to bear against flanges 138, 138', the various components of the above-described articulated connection between the chock plate 132 and the nut anchor block 118, as well as the jack screw components (rod 116, shaft 120, and nut 122), are no longer loaded.

Turning now to a general operating description of both the lateral and longitudinal chocking components of this invention, it will be noted that, since the plural longitudinal chocking systems 32 are completely reversible, only eight such longitudinal systems 32, and twelve lateral chocking systems 34 will be required on a typical railroad flatcar, assuming only two heavy vehicles will be chocked per flatcar. Before the top, side, or end loading of the vehicles, all longitudinal systems 32 should be lowered to their below-deck, stowed positions as seen in FIG. 4, preferably at preselected locations approximating the positions at each end of where a specific vehicle 28 is desired to be chocked. Further, all the lateral systems 34 should be lowered to their stowed position (A) of FIG. 6. After vehicle 28 is loaded, each longitudinal system 32 is raised and pre-positioned by placing the lugs 52 of anchor block 48 in the desired notches 34 of track 42, axially shortening the longitudinal restraining arm 64 by threadedly adjusting nut 78 (such as shown by arm 64 in the phantom position of FIG. 2), and further by positioning the lugs 94 of anchor clock 90 in the desired notches 44 of track 42. At this time, the plural barrel bolts 96 can be adjusted to vertically support block 90 on upper flange 46 of track 42. Similarly, the plural barrel bolts 100 can be adjusted so as to retain arcuate anchor block 48 and insure against the possibility of block 48 bouncing out of the preselected position due to train-line vibrations.

Continuing the chocking procedure, the adjusting nut 78 is rotated as above described until the bearing block 74 directly abuts and snubs grouser track 30. At the same time, or after all longitudinal systems 32 have been properly positioned and adjusted, the plural lateral chocking systems 34 can be pivoted from their stowed positions to their chocking positions. It is a matter of operator's discretion as to whether the longitudinal restraining arm 64, once adjustably positioned, provides a chocking force directly through the axle of the vehicle's grouser track idler (not shown, or through the axle of a threaded vehicle, also not shown), or alternatively, a chocking force aligned somewhat above the vehicle's axle loading. Such force alignment depends upon the extent and magnitude of vehicle momentum forces that are expected to be encountered.

From the foregoing, it is believed that those skilled in the art will readily appreciate the unique features and advantages of the present invention over previous types of chocking systems for securing heavy vehicles to flatbed carriers. Further, it is to be understood that while the present invention has been described in relation to a particular preferred embodiment as set forth in the accompanying drawings and as above described, the same nevertheless is susceptible to change, variation and substitution of equivalents without departure from the spirit and scope of this invention. It is therefore intended that the present invention be unrestricted by the foregoing description and drawings, except as may appear in the following appended claims.

The embodiments of the invention in which an exclusive property or privilege is claimed are defined as follows:

1. In combination, a flatbed carrier having transverse and longitudinal sills undersupporting a flat deck, the top of said deck being characterized by at least one longitudinal track formed flush therein, and by plural transverse tracks formed flush therein at spaced locations therealong; plural lateral restraining apparatus each comprising a lateral load-engaging bearing plate extending into a respectively associated one of said transverse tracks and lateral positioning means for adjustably locating each said plate along a respectively associated one of said transverse tracks; plural reversible longitudinal restraining apparatus each comprising a restraining arm, a support member engaging said arm, and first and second anchor means for respectively releasably anchoring said restraining arm and said support member to said longitudinal track, said first and second anchor means further being operable to effect selective adjustment and positive locking of said arm and said member at selected positions therealong, said restraining arm and support member further characterized by the capability of assuming reversed positions to provide longitudinal restraint in either direction along said longitudinal track.

2. The invention of claim 1, and wherein each of said plural transverse tracks includes an adjacent deck opening of sufficient size to allow said bearing plate to be operably swung from an upright, above deck load-engaging position to a below deck storage position.

3. The invention of claim 1, and wherein said longitudinal track is of sufficient width and depth to permit said reversible longitudinal restraining apparatus to be stowed therein and therealong to provide an unfettered deck.

4. A heavy vehicle chocking system having both lateral and longitudinal chocking components for use on decked flatbed carriers, the system comprising in combination; plural lateral chocking apparatus for providing lateral restraint to a heavy vehicle stored on the carrier deck, each comprising a track formed transverse of said deck, a lateral bearing plate, and bearing plate positioning means operable to adjustably selectively position and releasably lock said plate along said transverse track, said transverse track having adjacent thereto an opening in said carrier deck, rotation means to permit said lateral bearing plate to rotate from an above deck load-engaging position to a below deck storage position; plural adjustably reversible longitudinal chocking apparatus for providing longitudinal restraint to a heavy vehicle, including at least one track formed longitudinally of said deck, a load restraining member, and a support element bearingly connected to said restraining member to provide support during the longitudinal loading thereof, each said member and element having separate anchorage means operable to respectively adjustably position and releasably lock said member and element along said longitudinal track, said separate anchorage means further being operable to provide relative height adjustment of said restraining member above said deck to effect relatively direct axial loading thereof; and said reversible longitudinal chocking apparatus being capable of being stored within said longitudinal track.

5. The invention of claim 4, and wherein said bearing plate positioning means includes jack screw means pin connected to said lateral bearing plate and supported by said transverse track, said jack screw means being operable when rotated to threadingly adjust said lateral bearing plate laterally against the ground engaging member of said vehicle to effect lateral restraint thereof.

6. The invention of claim 5, and wherein said bearing plate has transverse track engaging lugs formed in the lower regions thereof, and wherein said pin connection of said jack screw means and said bearing plate includes articulated lever means, whereby once said bearing plate is adjusted against the ground engaging member of said vehicle, said articulated lever means permits said track engaging lugs to directly bear against flanges formed on said transverse track whereby said lugs substantially carry the lateral restraining forces transmitted by said bearing plate.

7. The invention of claim 4, and wherein said load restraining member is axially adjustable to effect fine-positioning of the respective longitudinal chocking apparatus of said member.

8. The invention of claim 4, and wherein said load restraining member, at the end whereat said restraining member is bearingly connected to said support member, terminates in a bearing block having a configuration conforming to the ground engaging member of the vehicle being chocked.

9. A longitudinal chocking assembly for securing a load to a flatbed carrier wherein said carrier includes transverse and longitudinal sills undersupporting a flat deck, and a longitudinal track defined in said deck, said assembly comprising
    a longitudinal chock movably mounted in said track, said longitudinal chock comprising a first anchor slidably secured to said track,
    a longitudinally adjustable restraining arm having first and second ends, said first end coupled to said first anchor block,
    a second anchor block removably secured to said track, and
    a support member having first and second ends, said first end of said support member pivotally coupled to said second end of said restraining arm, said second end of said support member pivotally coupled to said second anchor block.

10. The longitudinal chocking assembly set forth in claim 9, further comprising a load engaging member secured to said second end of said restraining arm.

11. The longitudinal chocking assembly set forth in claim 9, said restraining arm comprising first and second internally threaded portions, an externally threaded section having a first end threaded into said first portion and a second end threaded into said second portion, and an adjusting nut affixed to said threaded section for rotating said threaded section.

12. The longitudinal chocking assembly set forth in claim 11, said track further including means for allowing removal of said second anchor block from said track, said first end of said restraining arm being pivotally coupled to said first anchor block thereby allowing rotation and reversal of said longitudinal chocking assembly relative to said deck.

13. The longitudinal chocking assembly set forth in claim 12, further comprising first means for locking said first anchor block relative to said track, and second means for locking said second anchor block relative to said track.

14. A lateral chocking assembly for securing a load to a flatbed carrier wherein said carrier includes transverse and longitudinal sills undersupporting a flat deck, and a transverse channel defined on said carrier, said assembly comprising:
a threaded shaft positioned within said channel,
a chock plate pivotally coupled to said shaft, and
a drive rod secured to said channel and threadably coupled to said shaft, said drive rod operable to position said plate relative to said deck.

15. The lateral chocking assembly set forth in claim 14, said channel having first and second ends, an opening in said deck adjacent said first end of said channel, said plate positioned in said opening in a stowed configuration, and means for guiding said plate onto an upper surface of said channel upon said plate being moved by actuation of said drive rod.

16. The lateral chocking system set forth in claim 15 said plate having a larger transverse dimension than said channel.

17. A system for longitudinally and laterally chocking a load to a flatbed carrier wherein said carrier includes a deck, at least one longitudinal track and at least one transverse channel defined in said deck, said system comprising,
at least one longitudinal chock slidably mounted in said track, said longitudinal chock including
a first mounting member releasably secured to said track,
a longitudinally adjustable compressive load member pivotally secured to said first mounting member, said compressive load member comprising first and second body members and a connecting element having a first end threadably coupled to said first body member and a second end threadably coupled to said second body member,
a second mounting member releasably secured to said track,
a tensile load member pivotally coupled at a first end to said compressive load member, and pivotally coupled at a second end to said second mounting member, and
at least one lateral chock mounted in said channel, said lateral chock comprising
a plate,
an anchor block slidably mounted in said channel, said plate being pivotally coupled to said block,
a shaft threadably secured at a first end to said block, and
means for threading said shaft relative to said anchor block thereby moving said plate relative to said channel.

18. The system set forth in claim 17, further comprising means for removing said second mounting member from said track and for allowing placement of said mounting member in said track.

19. The system set forth in claim 17, further comprising a member for engaging said load secured to said compressive load member.

20. The system set forth in claim 17, further comprising first means for locking said first mounting member to said track and second means for locking said second mounting member to said track.

21. The system set forth in claim 17, said deck including an opening in said deck adjacent said channel, said plate movable by said threading means to a position within said opening.

22. The system set forth in claim 21, said channel further comprising means for guiding said plate onto an upper surface of said channel upon said plate being moved from said opening by said threading means.

* * * * *